United States Patent
Shu

(10) Patent No.: US 10,333,835 B2
(45) Date of Patent: Jun. 25, 2019

(54) PACKET TRANSMISSION METHOD, APPARATUS, AND SYSTEM

(71) Applicant: HUAWEI TECHNOLOGIES CO., LTD., Shenzhen, Guangdong (CN)

(72) Inventor: Xieliu Shu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 15/416,626

(22) Filed: Jan. 26, 2017

(65) Prior Publication Data

US 2017/0149660 A1 May 25, 2017

Related U.S. Application Data

(63) Continuation of application No. PCT/CN2015/084781, filed on Jul. 22, 2015.

(30) Foreign Application Priority Data

Jul. 30, 2014 (CN) .......................... 2014 1 0370835

(51) Int. Cl.
| | |
|---|---|
| *H04L 12/717* | (2013.01) |
| *H04L 12/771* | (2013.01) |
| *H04L 12/841* | (2013.01) |

(52) U.S. Cl.
CPC .............. *H04L 45/42* (2013.01); *H04L 45/56* (2013.01); *H04L 47/28* (2013.01)

(58) Field of Classification Search
None
See application file for complete search history.

(56) References Cited

U.S. PATENT DOCUMENTS

| 8,654,757 B2 * | 2/2014 | Ai ....................... H04W 72/005 |
| | | 370/350 |
| 2002/0186167 A1 * | 12/2002 | Anderson ................. G01S 5/02 |
| | | 342/465 |

(Continued)

FOREIGN PATENT DOCUMENTS

| CN | 1852265 A | 10/2006 |
| CN | 101217483 A | 7/2008 |

(Continued)

OTHER PUBLICATIONS

International Search Report Dated Sep. 24, 2015 in corresponding International Application No. PCT/CN2015/084781.

(Continued)

*Primary Examiner* — Eunsook Choi
(74) *Attorney, Agent, or Firm* — Staas & Halsey LLP

(57) ABSTRACT

A packet transmission method that is executed in a communications system that includes at least two service nodes and at least one virtual node, where a target virtual node has at least two service time periods, the target virtual node is corresponding only to one service node in one service time period, and is corresponding to different service nodes in two adjacent service time periods. A dispatching device receives a target service packet carries time indication information, and the time indication information is used to indicate an interval between a sending time of the target packet and a sending time of the first packet of the target service; determines a receiving time of the first packet according to the time indication information; and determining a target service node according to the receiving time.

17 Claims, 5 Drawing Sheets

(56) References Cited

U.S. PATENT DOCUMENTS

| | | | |
|---|---|---|---|
| 2010/0061347 A1* | 3/2010 | Bracha | H04W 72/1226 |
| | | | 370/336 |
| 2013/0114414 A1 | 5/2013 | Song | |
| 2013/0151586 A1 | 6/2013 | Morishige et al. | |
| 2013/0266008 A1 | 10/2013 | Xue et al. | |
| 2014/0277850 A1* | 9/2014 | Jobs | B63H 19/00 |
| | | | 701/2 |
| 2018/0249465 A1* | 8/2018 | Au | H04W 72/0446 |

FOREIGN PATENT DOCUMENTS

| | | |
|---|---|---|
| CN | 102271079 A | 12/2011 |
| CN | 102546357 A | 7/2012 |
| CN | 102932269 A | 2/2013 |
| CN | 103201989 A | 7/2013 |
| CN | 104158755 A | 11/2014 |
| WO | 2014/059931 A1 | 4/2014 |

OTHER PUBLICATIONS

International Search Report dated Sep., 24, 2015 in corresponding International Patent Application No. PCT/CN2015/084781.

Chinese Search Report dated Dec. 2, 2016 in corresponding Chinese Patent Application No. 2014103708356.

Chinese Office Action dated Dec. 12, 2016 in corresponding Chinese Patent Application No. 201410370835.6.

Hu, Li-cong et al. "A Consistent Hash Load Balancing Algorithm Based on Dynamic Feedback," Microelectronics & Computer, vol. 29, No. 1, Jan. 2012.

* cited by examiner

100

A dispatching device receives a target packet sent by user equipment, and determines that the target packet is corresponding to a target virtual node, where the target packet belongs to a target service, the target packet carries time indication information, and the time indication information is used to indicate an interval between a sending time of the target packet and a sending time of the first packet of the target service ⸺ S110

Determine a receiving time of the first packet of the target service according to a receiving time of the target packet and the time indication information ⸺ S120

Determine a target service node from at least two service nodes according to the receiving time of the first packet of the target service, and forward the target packet to the target service node, where the receiving time of the first packet of the target service falls within a target time segment, and the target service node is a service node corresponding to the target virtual node in the target time segment ⸺ S130

S210 — User equipment determines an interval between a sending time of a target packet and a sending time of the first packet of a target service, where the target packet belongs to the target service S220 — Send the target packet to at least one dispatching device, where the target packet carries time indication information, and the time indication information is used to indicate the interval between the sending time of the target packet and the sending time of the first packet of the target service

Packet transmission apparatus 300

Allocation unit 340

Receiving unit 310

Determining unit 320

Sending unit 330

FIG. 4

PACKET TRANSMISSION METHOD, APPARATUS, AND SYSTEM

CROSS-REFERENCE TO RELATED APPLICATIONS

This application is a continuation of International Application No. PCT/CN2015/084781, filed on Jul. 22, 2015, which claims priority to Chinese Patent Application No. 201410370835.6, filed on Jul. 30, 2014, The disclosures of the aforementioned applications are hereby incorporated by reference in their entireties.

TECHNICAL FIELD

The present disclosure relates to the communications field, and more specifically, to a packet transmission method, apparatus, and system.

BACKGROUND

Currently, it is a known technology in which a group of service nodes (for example, servers or service processing units) constitute a service node cluster that is scalable and capable of high-availability network service. In this technology, the group of service nodes in the cluster are connected to each other by using a high-speed local area network or a geographically-distributed wide area network, and one or more dispatching devices (for example, load balancers or dispatching units) exist at a front end of the group of service nodes. The dispatching device can seamlessly schedule a packet from user equipment to a service node. For the user equipment, a structure of the service node cluster is transparent, and the user equipment accesses a service provided by the service node cluster as if accessing a high-performance and high-availability service node.

To ensure service continuity, for multiple packets of a same service, it is required to ensure that the packets can be sent to a same service node for processing.

In view of this, an existing practice is that the dispatching device creates a flow table for each service (or for each passing traffic flow), where the flow table records a mapping relationship between a quintuple of a packet of the service and a service node that processes the service. Specifically, when the dispatching device receives a packet, the dispatching device searches for a flow table according to a quintuple of the packet. If there is no record in the flow table, it indicates that the packet belongs to a new flow, and the dispatching device allocates the packet to a service node at a back end, creates a flow table, and stores a mapping relationship, such as <a quintuple, a selected service node>. If there is a flow table, it indicates that the packet belongs to an existing service, and the dispatching device dispatches the packet to a service node that is stored in the flow table and that is corresponding to a quintuple of the packet, for processing.

However, because concurrent traffic is increasing with rapid development of communications technologies, for example, a quantity of online sessions on a wireless network can generally reach a level of 10 million, processing overheads for querying a flow table are huge, which causes dispatching efficiency to decrease linearly with an increase of sessions. In addition, a relatively large quantity of sessions causes an increase of memory used for storing the flow table. Assuming that a flow table occupies 100-byte (Byte) memory, approximately 1-gigabyte (GB) memory overheads are needed for maintaining 10 million sessions.

SUMMARY

The present disclosure provides a packet transmission method, apparatus, and system, so as to improve packet dispatching efficiency and reduce memory overheads on the premise of maintaining service continuity.

According to a first aspect, a packet transmission method is provided, where the method is executed in a communications system that includes at least two service nodes, a target virtual node in at least one virtual node has at least two service time periods, the target virtual node is corresponding only to one service node in one service time period, and the target virtual node is corresponding to different service nodes in two adjacent service time periods; and the method includes: receiving, by a dispatching device, a target packet sent by user equipment, and determining that the target packet is corresponding to the target virtual node, where the target packet belongs to a target service, the target packet carries time indication information, and the time indication information is used to indicate an interval between a sending time of the target packet and a sending time of the first packet of the target service; determining a receiving time of the first packet of the target service according to a receiving time of the target packet and the time indication information; and determining a target service node from the at least two service nodes according to the receiving time of the first packet of the target service, and forwarding the target packet to the target service node, where the receiving time of the first packet of the target service falls within a target time period, and the target service node is a service node corresponding to the target virtual node in the target time period.

With reference to the first aspect, in a first implementation manner of the first aspect, the method further includes: determining, by the dispatching device, a boundary time-point, where the target virtual node is corresponding to a first service node in a time period before the boundary time-point, and a load status of the first service node at the boundary time-point meets a preset condition; allocating two service time periods to the target virtual node according to the boundary time-point, where the boundary time-point is an end time of a first service time period, the boundary time-point is a start time of a second service time period, the first service time period is the time period before the boundary time-point, and the second service time period is a time period after the boundary time-point; and determining that the target virtual node is corresponding to the first service node in the first service time period, and determining that the target virtual node is corresponding to a second service node in the second service time period.

With reference to the first aspect and the foregoing implementation manner of the first aspect, in a second implementation manner of the first aspect, that a load status of the first service node at the boundary time-point meets a preset condition includes: a difference between a load ratio of the first service node at the boundary time-point and a load ratio of the second service node at the boundary time-point is greater than or equal to a first preset threshold.

With reference to the first aspect and the foregoing implementation manners of the first aspect, in a third implementation manner of the first aspect, the first service node is a service node whose load ratio at the boundary time-point is the highest in the at least two service nodes.

With reference to the first aspect and the foregoing implementation manners of the first aspect, in a fourth implementation manner of the first aspect, the second service node is a service node whose load ratio at the boundary time-point is the lowest in the at least two service nodes.

With reference to the first aspect and the foregoing implementation manners of the first aspect, in a fifth implementation manner of the first aspect, the target virtual node is a virtual node whose load ratio at the boundary time-point is the lowest in virtual nodes corresponding to the first service node in the first service time period.

With reference to the first aspect and the foregoing implementation manners of the first aspect, in a sixth implementation manner of the first aspect, the load status of the first service node at the boundary time-point is determined according to a quantity of services transmitted to the first service node in the first time period.

With reference to the first aspect and the foregoing implementation manners of the first aspect, in a seventh implementation manner of the first aspect, the determining that the target packet is corresponding to the target virtual node includes: extracting decision information from the target packet, where the decision information includes at least one piece of the following information: a source Internet Protocol IP address of the target packet, a destination IP address of the target packet, a source port number of the target packet, a destination port number of the target packet, a communication protocol type of the target packet, a destination uniform resource locator of the target packet, and a service identity that is used to indicate a service to which the target packet belongs; and determining, according to the decision information, that the target packet is corresponding to the target virtual node.

With reference to the first aspect and the foregoing implementation manners of the first aspect, in an eighth implementation manner of the first aspect, a difference between time precision of the dispatching device and time precision of the user equipment falls within a preset range.

With reference to the first aspect and the foregoing implementation manners of the first aspect, in a ninth implementation manner of the first aspect, the time precision of the dispatching device is 10 milliseconds, and the time precision of the user equipment is 10 milliseconds.

According to a second aspect, a packet transmission method is provided, where the method includes: determining, by a user equipment, an interval between a sending time of a target packet and a sending time of a first packet of a target service, wherein the target packet belongs to the target service, where the target packet belongs to the target service; and sending, by the user equipment, the target packet to at least one dispatching device, where the target packet carries time indication information, and the time indication information is used to indicate an interval between a sending time of the target packet and a sending time of the first packet of the target service.

With reference to the second aspect, in a first implementation manner of the second aspect, a difference between time precision of the dispatching device and time precision of the user equipment falls within a preset range.

With reference to the second aspect and the foregoing implementation manner of the second aspect, in a second implementation manner of the second aspect, the time precision of the dispatching device is 10 milliseconds, and the time precision of the user equipment is 10 milliseconds.

According to a third aspect, a packet transmission apparatus is provided, where the apparatus is configured in a communications system that includes at least two service nodes, a target virtual node in at least one virtual node has at least two service time periods, the target virtual node is corresponding only to one service node in one service time period, and the target virtual node is corresponding to different service nodes in two adjacent service time periods; and the apparatus includes hardware or software modules for implementing the steps of the first aspect, or the foregoing implementation manners of the first aspect.

According to a fourth aspect, a packet transmission apparatus is provided, where the apparatus includes hardware or software modules for implementing the steps of the second aspect, or the foregoing implementation manners of the second aspect.

According to a fifth aspect, a packet transmission system is provided, where the system includes: at least two service nodes, configured to perform service processing on a packet transmitted to the at least two service nodes, where a target virtual node in at least one virtual node has at least two service time periods, the target virtual node is corresponding only to one service node in one service time period, and the target virtual node is corresponding to different service nodes in two adjacent service time periods; at least one user equipment, configured to send a target packet to the service node when accessing a target service, where the target packet carries time indication information, and the time indication information is used to indicate an interval between a sending time of the target packet and a sending time of the first packet of the target service; and at least one dispatching device, configured to: receive the target packet sent by the user equipment, and determine that the target packet is corresponding to the target virtual node; determine a receiving time of the first packet of the target service according to a receiving time of the target packet and the time indication information; and determine a target service node from the at least two service nodes according to the receiving time of the first packet of the target service, and forward the target packet to the target service node, where the receiving time of the first packet of the target service falls within a target time period, and the target service node is a service node corresponding to the target virtual node in the target time period.

According to the packet transmission method, apparatus, and system in the present disclosure, a dispatching device determines in advance a service node corresponding to a target virtual node in each service time period, and when sending a target packet of a target service, user equipment adds time indication information into the target packet, where the time indication information is used to indicate a time interval between a sending time of the target packet and a sending time of the first packet of the target service. Therefore, when determining that the target packet is corresponding to the target virtual node, the dispatching device can determine, according to the time indication information, a receiving time of the first packet of the target service and a service time period within which the receiving time of the first packet falls, so as to determine a service node to which the first packet of the target service is transmitted, and send the target packet to the service node to which the first packet of the target service is transmitted, which can maintain service continuity. In addition, a mapping relationship between a quintuple of a packet of a service and a service node that processes the service does not need to be stored, which can reduce memory overheads. Using a time period to index a server to which the packet is to be sent can improve packet dispatching efficiency.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 is a schematic flowchart of a packet transmission method according to an embodiment of the present disclosure;

FIG. 3 is a schematic flowchart of a packet transmission method according to another embodiment of the present disclosure;

FIG. 4 is a schematic block diagram of a packet transmission apparatus according to an embodiment of the present disclosure;

DESCRIPTION OF EMBODIMENTS

Figure 2:
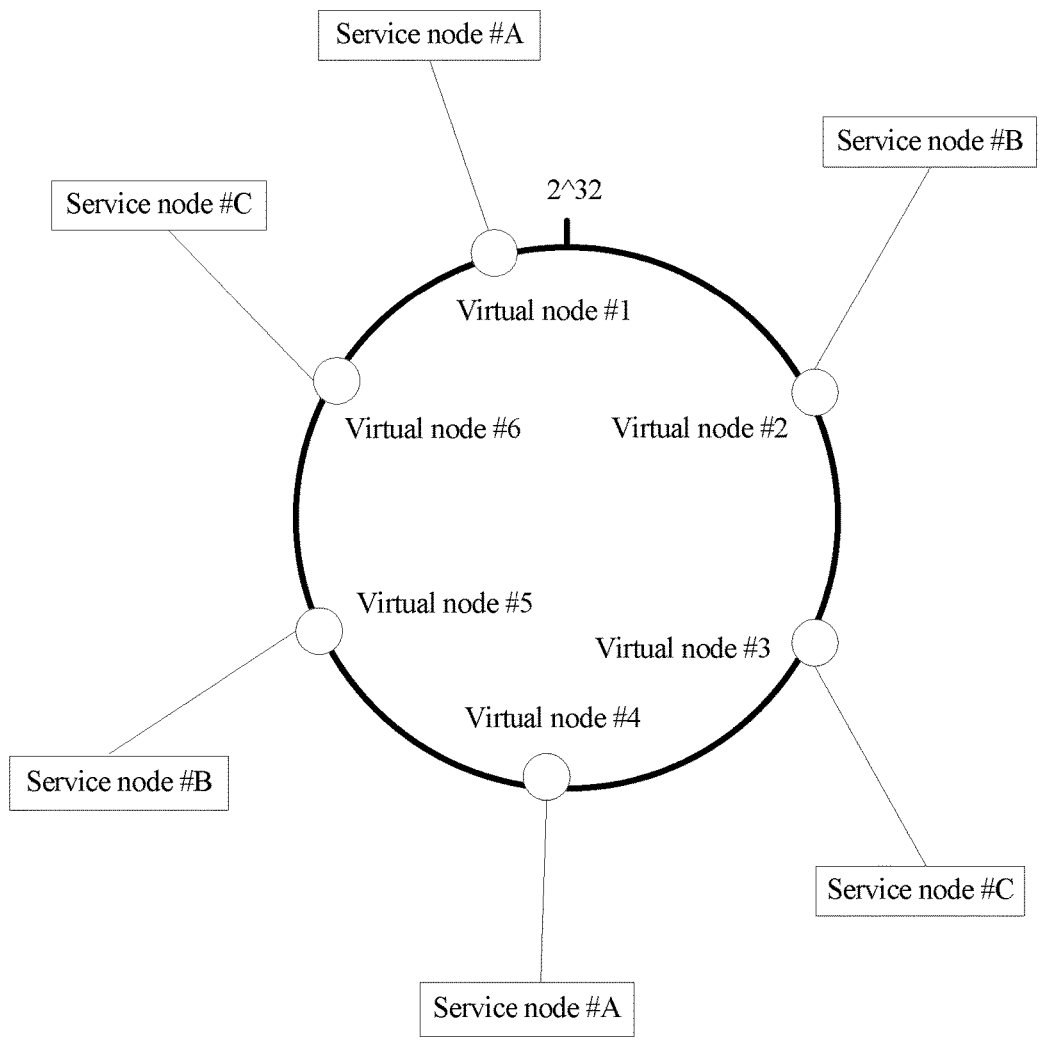
FIG. 2 is a schematic diagram of an example of a mapping relationship between virtual nodes and service nodes according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure.

The technical solutions of the present disclosure may be applied to various communications systems, such as: a Global System for Mobile Communications (GSM), a Code Division Multiple Access (CDMA) system, Wideband Code Division Multiple Access (WCDMA), a general packet radio service (GPRS), Long Term Evolution (LTE), and software-defined networking (SDN).

User equipment (UE) may be a mobile terminal, mobile user equipment, and the like, and may communicate with one or more core networks by using a radio access network (for example, RAN, Radio Access Network). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges message and/or data with the radio access network. In addition, the user equipment may also be a device, such as a computer, that accesses a server by using Ethernet, an optical fiber, or the like. In addition, the user equipment may further be a user's gateway device used for connecting to an access network, or the like.

A service node may be, for example, an SDN server, a web server, a File Transfer Protocol (FTP) server, an enterprise application-critical server and another mission-critical server (such as a server that provides a firewall service), or a service process unit (SPU) in the communication technology (CT) field. In the embodiments of the present disclosure, a destination server and other servers constitute a server cluster, to expand bandwidth of a network device and the servers, increase a throughput, enhance a network data processing capability, and improve network flexibility and availability. Within the server cluster, the servers have different Internet Protocol (IP) addresses (the following implicit IP addresses) and ports (the following internal ports). In addition, the server cluster has a uniform externally oriented (for example, client device-oriented) IP address (the following explicit IP address) and port (the following external port).

A dispatching device may be disposed between the service node and the user equipment, and can share a large amount of concurrent access or data traffic to multiple service nodes for separate processing, so as to reduce response waiting time for the user equipment.

In the embodiments of the present disclosure, the dispatching device may be further configured to perform load balancing for a data packet by executing various programs. For example, the dispatching device may share a single heavy load operation to the multiple service nodes for concurrent processing, and after all the service nodes complete processing, gather and return results to the user equipment, thereby substantially improving a system processing capability.

In the embodiments of the present disclosure, for example, load balancing can be implemented by using a software load balancing solution. The software load balancing solution refers to implementation of load balancing by installing one or more additional application programs in an operating system of one or more servers, so that load balancing is implemented by executing the software.

In addition, in the embodiments of the present disclosure, the dispatching device may also be directly installed between the server and an external network, independent of the operating system of the server.

In the embodiments of the present disclosure, as an example instead of a limitation, the dispatching device may be a dispatching unit (DPU) in the CT field, or may be a load balancer (LB) or a gateway device capable of performing load balancing in the information technology (IT) field, or may be a controller in an SDN system, which is not particularly limited in the present disclosure and may be subject to any alteration according to the field and a specific communications system to which the present disclosure is applied.

In the embodiments of the present disclosure, for example, manners in which the dispatching device sends a packet to the service node may be enumerated as follows:

1. a network address translation (NAT) manner, that is, the dispatching device rewrites a destination address/source address of a packet from the user equipment, and sends the modified packet to each service node; in addition, when a response packet from the service node passes by the dispatching device, the dispatching device rewrites a source address/destination address of the response packet, and then returns the response packet to the user equipment;

2. a direct route (DR) manner, that is, the dispatching device rewrites a Media Access Control (MAC) address of a packet from the user equipment and sends a request to the service node, and the service node directly returns a response packet to the user equipment; and 3. an IP tunnel (TUN, TUNNEL) manner, that is, the dispatching device forwards a packet from the user equipment to the service node through an IP tunnel, and the service node directly returns a response packet to the user equipment.

In the various transmission manners enumerated above, the dispatching device can map one explicit IP address to multiple implicit IP addresses (corresponding to all the servers). It should be understood that the foregoing enumerated transmission manners are merely an illustrative description, and the present disclosure is not limited thereto.

FIG. 1 shows a schematic flowchart of a packet transmission method 100 described from a perspective of a dispatching device according to an embodiment of the present disclosure. The method 100 is executed in a communications system that includes at least two service nodes, a target virtual node in at least one virtual node has at least two service time periods, the target virtual node is corresponding only to one service node in one service time period, and the target virtual node is corresponding to different service nodes in two adjacent service time periods. As shown in FIG. 1, the method 100 includes the following steps:

S110. The dispatching device receives a target packet sent by user equipment, and determines that the target packet is corresponding to the target virtual node, where the target packet belongs to a target service, the target packet carries time indication information, and the time indication information is used to indicate an interval between a sending time of the target packet and a sending time of the first packet of the target service.

S120. Determine a receiving time of the first packet of the target service according to a receiving time of the target packet and the time indication information.

S130. Determine a target service node from the at least two service nodes according to the receiving time of the first packet of the target service, and forward the target packet to the target service node, where the receiving time of the first packet of the target service falls within a target time period, and the target service node is a service node corresponding to the target virtual node in the target time period.

In this embodiment of the present disclosure, there may be one or more dispatching devices in the communications system, which is not particularly limited in the present disclosure. For ease of understanding and description, without loss of generality, the following uses a processing process performed by a dispatching device #A as an example for description.

Specifically, the dispatching device #A may determine, according to a quantity of service nodes in the communications system, a quantity of virtual nodes that need to be established. As an example instead of a limitation, the quantity of virtual nodes may be an integer multiple of (for example, twice) the quantity of service nodes. Alternatively, the dispatching device #A may determine, according to a processing capability of each service node, a quantity of virtual nodes that need to be established. As an example instead of a limitation, a quantity of virtual nodes corresponding to a service node may be in direct proportion to a service processing capability of the service node. That is, if a service node has a strong service processing capability, more virtual nodes may be allocated to the service node; if a service node has a poor service processing capability, fewer virtual nodes may be allocated to the service node.

Then, the dispatching device #A may establish (that is, initially determine) a mapping relationship between the virtual nodes and the service nodes. As described above, the quantity of virtual nodes is an integer multiple of the quantity of service nodes; therefore, one service node may be corresponding to multiple virtual nodes, but one virtual node is corresponding only to one service node. In a specific mapping method, for example, the virtual nodes and the service nodes may be separately numbered, and the virtual nodes and the service nodes are distributed on a $0\text{-}2^{32}$ ring by using a hash (hash) function H(x), where H(x) may be an MD5 hash algorithm or the like, so that virtual nodes that are corresponding to a same service node are as far as possible in distance on the hash ring.

FIG. 2 shows an example of the mapping relationship between the virtual nodes and the service nodes when the quantity of virtual nodes is 6 and the quantity of service nodes is 3. As shown in FIG. 2, six virtual nodes are evenly distributed on the hash ring whose range is $0\text{-}2^{32}$, and each virtual node is corresponding to two virtual nodes.

That is, an initially established mapping relationship is as follows:

a service node #A is corresponding to a virtual node #1 and a virtual node #4;

a service node #B is corresponding to a virtual node #2 and a virtual node #5; and a service node #C is corresponding to a virtual node #3 and a virtual node #6.

Currently, in the CT field and the IT field, a "tidal effect" becomes a problem attracting increasing attention of people and demanding an urgent solution.

Specifically, in the CT field, the "tidal effect" refers to a phenomenon in which a great many people gather in a central business district during working time and pour into a residential area in turn after work, or that in which crowds of people gather during some important activities (such as a sporting event and a concert). This phenomenon triggers a flow of traffic in a mobile communications system, and therefore heavy traffic suddenly surges at a particular moment in a hot spot, resulting in network congestion and disconnection and also bringing difficulty to capacity planning in an early stage of network construction.

In the IT field, the "tidal effect" refers to the following phenomenon: Traffic of access to enterprises (suppliers such as a portal site, an online retailer, and an online game company) is relatively mild during most of the daytime, and most servers in a background server cluster are in an idle state; however, with a large amount of private time after work, a great many users visit their respective favorite website, and in this case, a traffic surge or a traffic peak occurs in background servers.

To address the foregoing tidal effect, in this embodiment of the present disclosure, the dispatching device #A may perceive a load status of each service node in real time. When a service node overloading phenomenon occurs with the tidal effect, the dispatching device #A may dynamically adjust the quantity of service nodes, or the dispatching device #A makes a corresponding adjustment to the mapping relationship between the virtual nodes and the service nodes according to the load status of each service node.

The following describes a process of adjusting the mapping relationship between the virtual nodes and the service nodes.

Optionally, the method further includes:

determining, by the dispatching device, a boundary time-point, where the target virtual node is corresponding to a first service node in a time period before the boundary time-point, and a load status of the first service node at the boundary time-point meets a preset condition;

allocating two service time periods to the target virtual node according to the boundary time-point, where the boundary time-point is an end time of a first service time period, the boundary time-point is a start time of a second service time period, the first service time period is the time period before the boundary time-point, and the second service time period is a time period after the boundary time-point; and determining that the target virtual node is corresponding to the first service node in the first service time period, and determining that the target virtual node is corresponding to a second service node in the second service time period.

It should be first noted that the "time period" in this embodiment of the present disclosure refers to duration between two moments, or a time range. For example, a time period may be evenly or unevenly divided into multiple time periods.

In this embodiment of the present disclosure, the mapping relationship between the virtual nodes and the service nodes may vary in different time periods according to a load status of each virtual node and the load status of each service node. The foregoing initially established mapping relationship may be regarded as a mapping relationship of the service nodes in the first time period (a moment t1 to a moment t2).

It should be noted that in this embodiment of the present disclosure, when the mapping relationship is initially established, the moment t1 may be the same for each virtual node; however, because after the system runs, load statuses of the service nodes and the virtual nodes are different from each other, or time points at which the load statuses of the service nodes and the virtual nodes meet the following preset condition for triggering mapping relationship alteration are different from each other, the moment t2 may be different for each virtual node, and a similar case is true of an end time of each of the following time periods.

For ease of understanding and description, without loss of generality, the following uses an adjustment to a mapping relationship between the virtual node #1 (that is, an example of the target virtual node) in FIG. 2 and each service node as an example for description.

Specifically, as described above, when the mapping relationship is initially established, that is, from the moment t1, the virtual node #1 is corresponding to the service node #A.

Subsequently, the dispatching device #A may monitor the load statuses of the service nodes including the service node #A; and if it is determined at the moment t2 (that is, an example of the boundary time-point) that the service node #A is in, for example, an overloaded state, may search for a service node (which is denoted as the service node #B for ease of understanding and differentiation) whose load is relatively light at the moment t2, and replace the service node #A (an example of a first service node) with the service node #B (an example of a second service node) as a service node corresponding to the virtual node #1.

It should be noted that in this embodiment of the present disclosure, the dispatching device #A may monitor the load statuses of the service nodes in real time or in period, which is not particularly limited in the present disclosure. However, to reduce a burden on the dispatching device, the dispatching device preferably performs periodic monitoring. As an example instead of a limitation, the monitoring may be in a period of, for example, 10 seconds.

Similarly, if it is determined at a moment t3 (that is, another example of the boundary time-point) that the service node #B is in, for example, the overloaded state, the dispatching device #A may search for a service node (which is denoted as the service node #C for ease of understanding and differentiation) whose load is relatively light at the moment t3, and replace the service node #B (another example of the first server) with the service node #C (another example of the second server) as a service node corresponding to the virtual node #1.

That is, once it is determined that a load status of one service node meets the preset condition, a mapping relationship alteration procedure may be triggered.

In this embodiment of the present disclosure, a load status of a service node can be determined according to a real-time load ratio of the service node, where the real-time load ratio is used to indicate a ratio of current load of the service node to load of the service node in full-load operation. In a specific embodiment, a real-time load ratio R(A) of the service node #A may be determined according to the following formula:

$$R(A)=\max\{x,y,z\}$$

$$x=(Cp(A)-Cp\_N(A))/(Cp\_M(A)-Cp\_N(A))$$

$$y=(Ca(A)-Ca\_N(A))/(Ca\_M(A)-Ca\_N(A))$$

$$z=(Ne(A)-Ne\_N(A))/(Ne\_M(A)-Ne\_N(A))$$

Cp(A) represents a current central processing unit (CPU, Central Processing Unit) usage of the service node #A, Cp_N(A) represents a minimum value of a CPU processing capability of the service node #A, Cp_M(A) represents a maximum value of the CPU processing capability of the service node #A, Ca(A) represents a current memory usage of the service node #A, Ca_N(A) represents a minimum value of available memory of the service node #A, Ca_M(A) represents a maximum value of the available memory of the service node #A, Ne(A) represents a current network bandwidth usage of the service node #A, Ne_N(A) represents a minimum value of network bandwidth of the service node #A, and Ne_M(A) represents a maximum value of the network bandwidth of the service node #A.

For example, if it is determined that the R(A) of the service node #A at the moment t2 is greater than a preset threshold (which may be obtained, for example, in a simulation experiment manner), it can be determined that the service node #A is overloaded. Therefore, the virtual node #1 corresponding to the service node #A in a time period before the moment t2 may be allocated to the service node #B whose load is relatively light, so that it can be determined that the virtual node #1 is corresponding to the service node #A in the time period before the moment t2, and that the virtual node #1 is corresponding to the service node #B in a time period after the moment t2.

For another example, optionally, that a load status of the first service node at the boundary time-point meets a preset condition includes:

a difference between a load ratio of the first service node at the boundary time-point and a load ratio of the second service node at the boundary time-point is greater than or equal to a first preset threshold.

Specifically, similar to the foregoing determining the real-time load ratio R(A) of the service node #A, the dispatching device #A may determine real-time load ratios of all the service nodes in the system. Without loss of generality, a real-time load ratio of a service node #i is denoted as R(i). For example, when a real-time load ratio difference between the service node #A (an example of the first service node) and the service node #B (an example of the second service node) is greater than or equal to a preset threshold Rt (that is, an example of the first preset threshold, and for example, a value of Rt may be equal to 0.1), a current moment may be recorded as t2 (an example of the boundary time-point), and the virtual node #1 (an example of the target virtual node) corresponding to the service node #A in the time period before the moment t2 is allocated to the service node #B, so that it can be determined that the virtual node #1 is corresponding to the service node #A in the time period before the moment t2, and that the virtual node #1 is corresponding to the service node #B in the time period after the moment t2.

Optionally, the first service node is a service node whose load ratio at the boundary time-point is the highest in the at least two service nodes.

In addition, optionally, the second service node is a service node whose load ratio at the boundary time-point is the lowest in the at least two service nodes.

Specifically, when a load ratio difference between a service node whose load ratio is the highest in all the service nodes and a service node whose load ratio is the lowest in all the service nodes is greater than or equal to the foregoing preset threshold Rt, the foregoing mapping relationship adjustment procedure is triggered, and a system load imbalance can be identified more quickly, which can further improve system performance.

Optionally, the target virtual node is a virtual node whose load ratio at the boundary time-point is the lowest in virtual nodes corresponding to the first service node in the first service time period.

Specifically, when there are multiple virtual nodes corresponding to the service node #A in the time period before the foregoing moment t2, a virtual node whose load ratio is the lowest in the multiple virtual nodes may be a virtual node that processes a minimum quantity of services. As described above, because the target virtual node is corresponding to the service node #A in the time period before the moment t2, a service #A corresponding to the target virtual node needs to be transmitted to the service node #A. To ensure service continuity, although the target virtual node is corresponding to the service node #B in the time period after the moment t2, if a subsequent packet of the service #A exists, the packet of the service #A still needs to be transmitted to the service node #A, which therefore compromises an load balancing effect. The virtual node whose load ratio is the lowest is used as the target virtual node and allocated to the service node #B, so that a quantity of the foregoing services A existing in the target virtual node can be minimized, and the load balancing effect can be further improved.

Pseudocode for a mapping relationship adjustment algorithm in this embodiment of the present disclosure is as follows:

1. while $((R(H)-R(Z))>\alpha \cdot Rt)$ semantic meaning: determine a service node #H whose load ratio is the highest, and record a real-time load ratio R(H) of the service node #H; determine a service node #Z whose load ratio is the lowest, and record a real-time load ratio R(Z) of the service node #Z; and perform an outer loop to adjust a mapping relationship between the service node #Z and a virtual node until $(R(H)-R(Z))\leq \alpha \cdot Rt$;

2. Rank (VH1, . . . VHm)

semantic meaning: rank all virtual nodes corresponding to the service node #H in descending order of load ratios;

3. $\Delta Ltotal=\min\{((R_{AVG}-R(Z))\cdot a_z), ((R(H)-R_{AVG})\cdot a_h)\}$ semantic meaning: determine a minimum value between $(R_{AVG}-R(Z))\cdot a_z$ and $(R(H)-R_{AVG})\cdot a_h$, where an average load ratio $R_{AVG}$ of the service nodes may be determined according to the following formula 1:

$$R_{AVG} = \frac{\sum_{i=1}^{i=N}[R(i)\cdot a_i]}{\sum_{i=1}^{i=N} a_i} \quad \text{formula 1}$$

$a_i$ represents a capacity of any parameter including a CPU, a cache, network bandwidth of the service node i in a full-load state;

4. $\Delta L=0$; j=0

5. while $((\Delta L<\Delta Ltotal)\&\&(R(H)>R(Z)))$ semantic meaning: perform an inner loop to adjust a mapping relationship between the service node #H and a virtual node of the service node #Z until $\Delta L<\Delta Ltotal$ and $R(H)\leq R(Z)$;

6. Transmit $(V_{Hj}, Z)$ semantic meaning: adjust the mapping relationship and shift a virtual node j that are corresponding to the service node #H to the service node #Z;

7. j++ semantic meaning: process a next heavy-loaded virtual node of the service node #H;

8. $\Delta L+=L_{V_{Hj}}$

9. R(H)=R refresh(H)

semantic meaning: update the load ratio of the server #H;

10. R(Z)=R refresh(Z)

semantic meaning: update the load ratio of the server #Z;

11. end while semantic meaning: the inner loop ends;

12. R(H)=max{R(i)|i=1, . . . , N} semantic meaning: reacquire a service node whose load ratio is the highest;

13. R(Z)=min{R(i)|i=1, . . . , N} semantic meaning: reacquire a service node whose load ratio is the lowest;

14. end while semantic meaning: the outer loop ends, where $L_{V_{Hj}}$ represents load of a virtual node that ranks the $j^{th}$ ill all virtual nodes corresponding to the service node #H.

In this embodiment of the present disclosure, in a process of executing the algorithm, R(H) and R(Z) change as the inner loop is completed. By repeatedly performing Transmit $(V_{Hj}, Z)$ and updating R(H) and R(Z), a real-time load ratio difference (R(H)−R(Z)) of the system is finally decreased within a range of $(0-\alpha\cdot Rt)$, and in this case, it can be determined that the algorithm achieves a load adjustment purpose.

Therefore, as described above, for service nodes whose corresponding virtual nodes change (that is, including a heavy-loaded service node from which a virtual node needs to be shifted to another service node due to relatively heavy load and a light-loaded service node to which a virtual node needs to be shifted from another service node due to light load), at least one moment (that is, the boundary time-point) for adjusting the mapping relationship exists. For example, for the foregoing service node #A, the moment t2 exists; for the foregoing service node #B, the moment t2 and the moment t3 exist; and for the foregoing service node #C, the moment t3 exists.

The foregoing virtual node #1 is used as an example, and the dispatching device #A may generate, according to a service node corresponding to the virtual node #1 in each service time period (that is, a time period obtained by means of division according to each boundary time-point), a dispatching table (which may also be referred to as a grooming filter) shown in the following Table 1 for the virtual node #1.

TABLE 1

| | Service time period | t1-t2 | t2-t3 | t3-Next boundary time-point |
|---|---|---|---|---|
| Virtual node #1 | Service node | Service node #A | Service node #B | Service node #C |

Likewise, the foregoing dispatching table may be generated for each virtual node; therefore, the dispatching device #A can accurately and quickly determine, according to the dispatching table, a service node corresponding to each virtual node (including the target virtual node) in each service time period.

Optionally, the load status of the first service node at the boundary time-point is determined according to a quantity of services transmitted to the first service node in the first time period.

Specifically, in this embodiment of the present disclosure, the dispatching device #A may further determine a service processing amount of a service node corresponding to the virtual node #1 in each time period, for example, a quantity of processed services or a quantity of processed sessions. For example, as described above, a service node corresponding to the virtual node #1 in a time period t1-t2 is the service node #A, and when a quantity of sessions processed by the service node #A in the time period t1-t2 exceeds a preset threshold (for example, 50 sessions), it can be predicted that the service node #A may be overloaded, so that the foregoing procedure of determining the load ratio of the service node #A and adjusting the mapping relationship of the virtual node #1 may be initiated. Therefore, a load status of a service node can be quickly and conveniently predicted, and system performance is further improved.

It should be understood that the foregoing enumerated methods for determining the load status are merely an illustrative description, and the present disclosure is not limited thereto. For example, the load status may also be determined with reference to a computational capability or a service processing capability of a service node.

The following describes processing when the user equipment sends a packet.

In this embodiment of the present disclosure, when the user equipment sends the first packet (which is denoted as a packet A1) of a service (for ease of understanding and differentiation, the following uses the service #A as an example), a sending moment $T_{start\_send}$ of the packet A1 may be recorded, and when a subsequent packet (which is denoted as a packet A2) of the service #A is sent, a sending moment $T_{cur\_send}$ of the packet A2 may be recorded. Therefore, a time interval $T_{time\_stamp}$ between the moment $T_{cur\_send}$ and the moment $T_{start\_send}$ may be determined, that is, $T_{time\_stamp}=T_{cur\_send}-T_{start\_send}$. It should be noted that for the first packet of a service, $T_{time\_stamp}$ may be set to 0. Therefore, the dispatching device can easily determine, according to $T_{time\_stamp}$, whether a packet is the first packet of a service.

In addition, when sending the packet A2 to the service node by using the dispatching device, the user equipment may add information indicating the time interval $T_{time\_stamp}$ (that is, the time indication information) into the packet.

In addition, in this embodiment of the present disclosure, actions such as coding, modulating, and sending the packet by the user equipment may be similar to those in the prior art. To avoid repetition, detailed description of the actions is omitted herein.

The following uses the dispatching device #A as an example to describe processing when the dispatching device forwards the packet.

After receiving the packet sent by the user equipment, the dispatching device #A may determine a virtual node corresponding to the packet.

The determining that the target packet is corresponding to the target virtual node includes:

extracting decision information from the target packet, where the decision information includes at least one piece of the following information: a source Internet Protocol IP address of the target packet, a destination IP address of the target packet, a source port number of the target packet, a destination port number of the target packet, a communication protocol type of the target packet, a destination uniform resource locator of the target packet, and a service identity that is used to indicate a service to which the target packet belongs; and determining, according to the decision information, that the target packet is corresponding to the target virtual node.

Specifically, in this embodiment of the present disclosure, the dispatching device #A may acquire a keyword of the packet, such as a source IP address, a destination IP address, a source port number, a destination port number, a communication protocol type, a URL, or an identity indicating a service (or a session) to which the packet belongs; in addition, may obtain a hash value by means of calculation by using the foregoing keyword, and search clockwise for a virtual node closest to the hash value on the $0-2^{32}$ hash ring used in the foregoing S110.

It should be noted that generally, all packets of a same service have a same keyword. Therefore, hash values obtained by means of calculation according to different packets of a same service are the same, that is, the different packets of the same service are generally corresponding to a same virtual node.

The following uses an example in which a virtual node corresponding to the target service is the foregoing virtual node #1 for description.

When the dispatching device #A receives the first packet (that is, a packet whose $T_{time\_stamp}=0$, denoted as a packet I for ease of differentiation) of a service (for example, the target service), a receiving time $T_{start\_recv}$ of the packet I may be recorded. In addition, a service node corresponding to the virtual node #1 in a time period within which the receiving time of the packet I falls may be determined according to the foregoing Table 1. For ease of understanding, an example in which the receiving time of the packet I falls within the time period t1-t2 is used for description, that is, because the virtual node #1 is corresponding to the service node #A in the time period t1-t2, the packet I needs to be sent to the service node #A.

When the dispatching device #A receives a non-first packet (that is, a packet whose $T_{time\_stamp}\neq 0$, denoted as a packet II for ease of differentiation) of a service (for example, the target service), a receiving time $T_{cur\_recv}$ of the packet II may be recorded. In addition, a receiving time $T_{start\_recv\_estimate}$ of the first packet (for example, the foregoing packet I) of the service to which the packet II belongs can be estimated according to $T_{time\_stamp}$ and $T_{cur\_recv}$ of the packet II, where $T_{start\_recv\_estimate}=T_{cur\_recv}-T_{time\_stamp}$. Therefore, a service node corresponding to the virtual node #1 in a time period within which $T_{start\_recv\_estimate}$ falls may be determined according to the foregoing Table 1. As described above, when the packet II and the packet I belong to a same service, $T_{start\_recv\_estimate}$ falls within the time period t1-t2, that is, because the virtual node #1 is corresponding to the service node #A in the time period t1-t2, the packet II needs to be sent to the service node #A.

Optionally, a difference between time precision of the dispatching device and time precision of the user equipment falls within a preset range.

Specifically, considering a delay in packet transmission in an actual network environment, there may be an error between $T_{start\_recv\_estimate}$ and $T_{start\_recv}$.

Specifically, a delay in which the packet I sent by the user equipment arrives at the dispatching device #A is:

$$\Delta T_{start\_delay} = T_{start\_recv} - T_{start\_send};$$

a delay in which the packet II sent by the user equipment arrives at the dispatching device #A is:

$$\Delta T_{cur\_delay} = T_{cur\_recv} - T_{cur\_send};$$

therefore, the error between $T_{start\_recv}$ estimate and $T_{start\_recv}$ is:

$$\begin{aligned}
\Delta Terr &= T_{start\_recv\_estimate} - T_{start\_recv} \\
&= T_{cur\_recv} - T_{time\_stamp} - T_{start\_recv} \\
&= T_{cur\_recv} - (T_{cur\_send} - T_{start\_send}) - T_{start\_recv} \\
&= (T_{cur\_recv} - T_{cur\_send}) - (T_{start\_recv} - T_{start\_send}) \\
&= \Delta T_{cur\_delay} - \Delta T_{start\_delay}.
\end{aligned}$$

It can be learned that an estimation error of a first-packet arrival time of a service is in direct proportion to a network delay, that is, a longer network delay leads to a larger estimation error, and vice versa.

In addition, new services received both before and after each adjustment to the mapping relationship of a virtual node are affected by the error. For example, the mapping relationship of the virtual node #1 is adjusted at the moment t2, and the service node #A is replaced with the service node #B. An arrival time of the first packet I of the service #A is $T_{start\_recv}$=t2=1, and the first packet I is dispatched to the service node #A. At a time after t2, the subsequent packet II of the service #A arrives, and because a network delay increases and an estimated first-packet arrival time is $T_{start\_recv\_estimate}$=t2+1, the packet II is sent to the service node #B.

Therefore, the time precision of the dispatching device and the time precision of the user equipment are controlled to minimize a difference between $\Delta T_{cur\_delay}$ and $\Delta T_{start\_delay}$, which can avoid the foregoing case.

Optionally, the time precision of the dispatching device is 10 milliseconds, and the time precision of the user equipment is 10 milliseconds.

Specifically, data transmission on a current backbone network and a data center internal network is basically performed by using an optical fiber, with a transmission delay extremely short and basically at a millisecond level. A delay in a wireless environment is slightly longer and is at a level of 10 ms. Therefore, the time precision of the user equipment and the dispatching device may be set to 10 ms. In this way, the foregoing dispatching fault probability can be controlled to be below 0.1%.

It should be understood that the foregoing enumerated time precision of the dispatching device and time precision of the user equipment are merely an illustrative description, and the present disclosure is not limited thereto. The time precision of the dispatching device and time precision of the user equipment may be altered according to a system to which the present disclosure is applied. For example, if a processor clock frequency of a future computer is increased, the time precision may be properly prolonged, which may be, for example, 1 second.

It should be noted that if multiple dispatching devices are configured in the system, a case in which packets of a same service are dispatched by different dispatching devices may exist. In this case, all the dispatching devices may share a mapping relationship with each other and match each virtual node to a determined service node corresponding to the virtual node in each service time period, so that a case in which the packets of the same service are dispatched to different service nodes can be avoided, and service processing continuity can be further improved.

It should be noted that the foregoing enumerated cases in which the real-time load ratio is used as the load status are merely an illustrative description, and the present disclosure is not limited thereto. For example, a load status of a service node can also be predicted according to variations in a real-time load ratio of the service node in a specified time period. For example, if the real-time load ratio of the service node #A linearly increases in one time period, even though the real-time load ratio of the service node #A at the boundary time-point does not meet the foregoing condition for triggering the mapping relationship alteration, it can still be anticipated that the service node #A may be overloaded, and therefore, the mapping relationship alteration procedure can still be initiated at the boundary time-point.

According to the packet transmission method in the present disclosure, a dispatching device determines in advance a service node corresponding to a target virtual node in each service time period, and when sending a target packet of a target service, user equipment adds time indication information into the target packet, where the time indication information is used to indicate a time interval between a sending time of the target packet and a sending time of the first packet of the target service. Therefore, when determining that the target packet is corresponding to the target virtual node, the dispatching device can determine, according to the time indication information, a receiving time of the first packet of the target service and a service time period within which the receiving time of the first packet falls, so as to determine a service node to which the first packet of the target service is transmitted, and send the target packet to the service node to which the first packet of the target service is transmitted, which can maintain service continuity. In addition, a mapping relationship between a quintuple of a packet of a service and a service node that processes the service does not need to be stored, which can reduce memory overheads. Using a time period to index a server to which the packet is to be sent can improve packet dispatching efficiency.

In addition, the foregoing describes an embodiment in which the user equipment adds the foregoing time indication information into the packet so that the dispatching device estimates the receiving time of the first packet of the service according to the time indication information. However, the user equipment may also record the sending time of the first packet, and when sending the subsequent packet, add information indicating the sending time of the first packet into the packet, so that the dispatching device can determine the receiving time of the first packet of the service according to the information, so as to determine a server to which the subsequent packet needs to be transmitted.

FIG. 3 shows a schematic flowchart of a packet transmission method 200 described from a perspective of user equipment according to an embodiment of the present disclosure. The method 200 is executed in a communications system that includes at least two service nodes. As shown in FIG. 2, the method 200 includes the following steps:

S210. The user equipment determines an interval between a sending time of a target packet and a sending time of the first packet of a target service, where the target packet belongs to the target service.

S220. Send the target packet to at least one dispatching device, where the target packet carries time indication information, and the time indication information is used to indicate the interval between the sending time of the target packet and the sending time of the first packet of the target service.

Optionally, a difference between time precision of the dispatching device and time precision of the user equipment falls within a preset range.

Optionally, the time precision of the dispatching device is 10 milliseconds, and the time precision of the user equipment is 10 milliseconds.

Both a function of the user equipment and a process of interaction with another entity are the same as the description about the user equipment mentioned in the foregoing embodiment, and therefore details are not described herein again.

According to the packet transmission method in the present disclosure, a dispatching device determines in advance a service node corresponding to a target virtual node in each service time period, and when sending a target packet of a target service, user equipment adds time indication information into the target packet, where the time indication information is used to indicate a time interval between a sending time of the target packet and a sending time of the first packet of the target service. Therefore, when determining that the target packet is corresponding to the target virtual node, the dispatching device can determine, according to the time indication information, a receiving time of the first packet of the target service and a service time period within which the receiving time of the first packet falls, so as to determine a service node to which the first packet of the target service is transmitted, and send the target packet to the service node to which the first packet of the target service is transmitted, which can maintain service continuity. In addition, a mapping relationship between a quintuple of a packet of a service and a service node that processes the service does not need to be stored, which can reduce memory overheads. Using a time period to index a server to which the packet is to be sent can improve packet dispatching efficiency.

Figure 5:
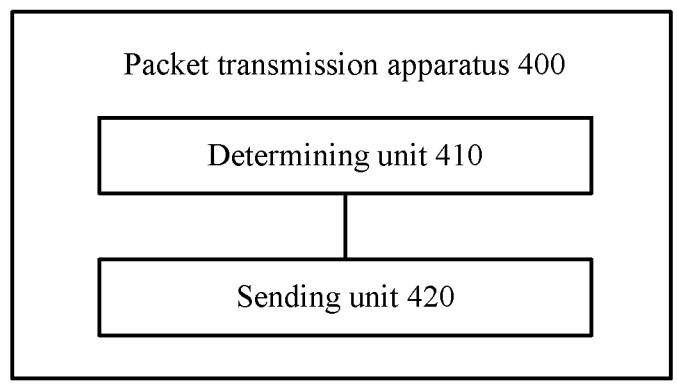
FIG. 5 is a schematic block diagram of a packet transmission apparatus according to another embodiment of the present disclosure.

The foregoing describes the packet transmission method in the embodiments of the present disclosure in detail with reference to FIG. 1 to FIG. 3, and the following describes a packet transmission apparatus according to an embodiment of the present disclosure in detail with reference to FIG. 4 and FIG. 5.

FIG. 4 shows a schematic block diagram of a packet transmission apparatus 300 according to an embodiment of the present disclosure. The apparatus 300 is configured in a communications system that includes at least two service nodes, a target virtual node in at least one virtual node has at least two service time periods, the target virtual node is corresponding only to one service node in one service time period, and the target virtual node is corresponding to different service nodes in two adjacent service time periods. As shown in FIG. 4, the apparatus 300 includes:

a receiving unit 310, configured to receive a target packet sent by the user equipment;

a determining unit 320, configured to: determine that the target packet received by the receiving unit 310 is corresponding to the target virtual node, where the target packet belongs to a target service, the target packet carries time indication information, and the time indication information is used to indicate an interval between a sending time of the target packet and a sending time of the first packet of the target service; determine a receiving time of the first packet of the target service according to a receiving time of the target packet and the time indication information; and determine a target service node from the at least two service nodes according to the receiving time of the first packet of the target service, where the receiving time of the first packet of the target service falls within a target time period, and the target service node is a service node corresponding to the target virtual node in the target time period; and a sending unit 330, configured to forward the target packet to the target service node determined by the determining unit 320.

Optionally, the apparatus further includes: the allocation unit 340, configured to determine a boundary time-point, where the target virtual node is corresponding to a first service node in a time period before the boundary time-point, and a load status of the first service node at the boundary time-point meets a preset condition;

allocate two service time periods to the target virtual node according to the boundary time-point, where the boundary time-point is an end time of a first service time period, the boundary time-point is a start time of a second service time period, the first service time period is the time period before the boundary time-point, and the second service time period is a time period after the boundary time-point; and determine that the target virtual node is corresponding to the first service node in the first service time period, and determine that the target virtual node is corresponding to a second service node in the second service time period.

Optionally, the allocation unit 310 is specifically configured to: after it is determined that a difference between a load ratio of the first service node at the boundary time-point and a load ratio of the second service node at the boundary time-point is greater than or equal to a first preset threshold, determine that the load status of the first service node at the boundary time-point meets the preset condition.

Optionally, the first service node is a service node whose load ratio at the boundary time-point is the highest in the at least two service nodes.

Optionally, the second service node is a service node whose load ratio at the boundary time-point is the lowest in the at least two service nodes.

Optionally, the target virtual node is a virtual node whose load ratio at the boundary time-point is the lowest in virtual nodes corresponding to the first service node in the first service time period.

Optionally, the load status of the first service node at the boundary time-point is determined according to a quantity of services transmitted to the first service node in the first time period.

Optionally, the determining unit 330 is specifically configured to extract decision information from the target packet, where the decision information includes at least one piece of the following information: a source Internet Protocol IP address of the target packet, a destination IP address of the target packet, a source port number of the target packet, a destination port number of the target packet, a communication protocol type of the target packet, a destination uniform resource locator of the target packet, and a service identity that is used to indicate a service to which the target packet belongs; and determine, according to the decision information, that the target packet is corresponding to the target virtual node.

Optionally, a difference between time precision of the apparatus 300 and time precision of the user equipment falls within a preset range.

Optionally, the time precision of the apparatus 300 is 10 milliseconds, and the time precision of the user equipment is 10 milliseconds.

The packet transmission apparatus 300 according to this embodiment of the present disclosure may be corresponding to a dispatching device (for example, a dispatching device #A) in the method according to the embodiments of the present disclosure. In addition, units, that is, modules, in the packet transmission apparatus 300 and the foregoing other operations and/or functions are used to separately implement corresponding procedures of the method 100 in FIG. 1. For brevity, details are not described herein again.

According to the packet transmission apparatus in the present disclosure, a dispatching device determines in advance a service node corresponding to a target virtual node in each service time period, and when sending a target packet of a target service, user equipment adds time indication information into the target packet, where the time indication information is used to indicate a time interval between a sending time of the target packet and a sending time of the first packet of the target service. Therefore, when determining that the target packet is corresponding to the target virtual node, the dispatching device can determine, according to the time indication information, a receiving time of the first packet of the target service and a service time period within which the receiving time of the first packet falls, so as to determine a service node to which the first packet of the target service is transmitted, and send the target packet to the service node to which the first packet of the target service is transmitted, which can maintain service continuity. In addition, a mapping relationship between a quintuple of a packet of a service and a service node that processes the service does not need to be stored, which can reduce memory overheads. Using a time period to index a server to which the packet is to be sent can improve packet dispatching efficiency.

FIG. 5 shows a schematic block diagram of a packet transmission apparatus 400 according to an embodiment of the present disclosure. As shown in FIG. 5, the apparatus 400 includes:

a determining unit 410, configured to determine an interval between a sending time of a target packet and a sending time of the first packet of a target service, where the target packet belongs to the target service; and a sending unit 420, configured to send the target packet to at least one dispatching device, where the target packet carries time indication information, and the time indication information is used to indicate the interval between the sending time of the target packet and the sending time of the first packet of the target service.

Optionally, a difference between time precision of the dispatching device and time precision of the apparatus 400 falls within a preset range.

Optionally, the time precision of the dispatching device is 10 milliseconds, and the time precision of the apparatus 400 is 10 milliseconds.

The packet transmission apparatus 400 according to this embodiment of the present disclosure may be corresponding to user equipment in the method according to the embodiments of the present disclosure. In addition, units, that is, modules, in the packet transmission apparatus 400 and the foregoing other operations and/or functions are used to separately implement corresponding procedures of the method 200 in FIG. 3. For brevity, details are not described herein again.

According to the packet transmission apparatus in the present disclosure, a dispatching device determines in advance a service node corresponding to a target virtual node in each service time period, and when sending a target packet of a target service, user equipment adds time indication information into the target packet, where the time indication information is used to indicate a time interval between a sending time of the target packet and a sending time of the first packet of the target service. Therefore, when determining that the target packet is corresponding to the target virtual node, the dispatching device can determine, according to the time indication information, a receiving time of the first packet of the target service and a service time period within which the receiving time of the first packet falls, so as to determine a service node to which the first packet of the target service is transmitted, and send the target packet to the service node to which the first packet of the target service is transmitted, which can maintain service continuity. In addition, a mapping relationship between a quintuple of a packet of a service and a service node that processes the service does not need to be stored, which can reduce memory overheads.

Using a time period to index a server to which the packet is to be sent can improve packet dispatching efficiency.

Figure 6:
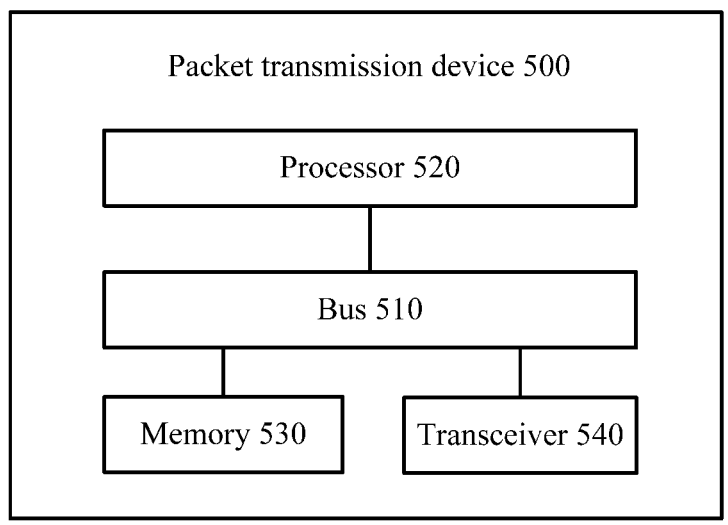
FIG. 6 shows a schematic structure of a packet transmission device according to an embodiment of the present disclosure.
Figure 7:
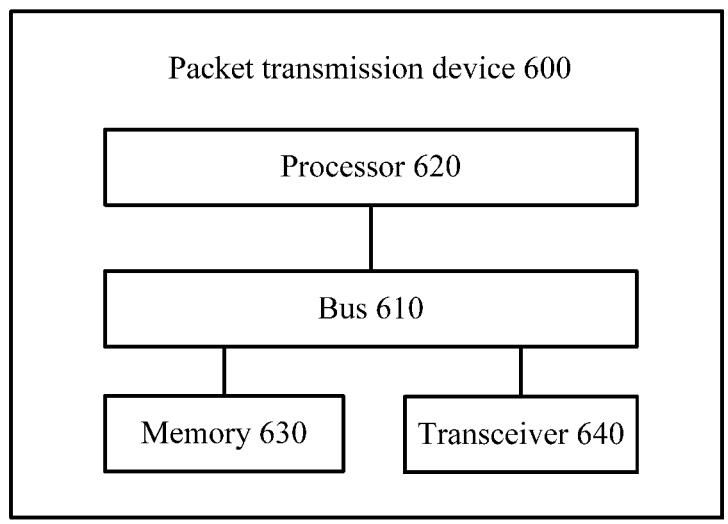
FIG. 7 shows a schematic structure of a packet transmission device according to another embodiment of the present disclosure.

The foregoing describes the packet transmission method in the embodiments of the present disclosure in detail with reference to FIG. 1 to FIG. 3, and the following describes a packet transmission device in an embodiment of the present disclosure in detail with reference to FIG. 6 and FIG. 7.

FIG. 6 shows a packet transmission device 500 according to an embodiment of the present disclosure. The device 500 is configured in a communications system that includes at least two service nodes, a target virtual node in at least one virtual node has at least two service time periods, the target virtual node is corresponding only to one service node in one service time period, and the target virtual node is corresponding to different service nodes in two adjacent service time periods. As shown in FIG. 6, the device 500 includes:

a bus 510;
a processor 520 connected to the bus 510;
a memory 530 connected to the bus 510; and
a transceiver 540 connected to the bus 510.

The processor 520 invokes, by using the bus 510, a program stored in the memory 530, so as to: control the transceiver 540 to receive a target packet sent by the user equipment, and determine that the target packet is corresponding to the target virtual node, where the target packet belongs to a target service, the target packet carries time indication information, and the time indication information is used to indicate an interval between a sending time of the target packet and a sending time of the first packet of the target service;

determine a receiving time of the first packet of the target service according to a receiving time of the target packet and the time indication information; and determine a target service node from the at least two service nodes according to the receiving time of the first packet of the target service, and control the transceiver 540 to forward the target packet to the target service node, where the receiving time of the first packet of the target service falls within a target time period, and the target service node is a service node corresponding to the target virtual node in the target time period.

Optionally, the processor 520 is specifically configured to: determine a boundary time-point, where the target virtual node is corresponding to a first service node in a time period before the boundary time-point, and a load status of the first service node at the boundary time-point meets a preset condition;

allocate two service time periods to the target virtual node according to the boundary time-point, where the boundary time-point is an end time of a first service time period, the boundary time-point is a start time of a second service time period, the first service time period is the time period before the boundary time-point, and the second service time period is a time period after the boundary time-point; and determine that the target virtual node is corresponding to the first service node in the first service time period, and determine that the target virtual node is corresponding to a second service node in the second service time period.

Optionally, the processor 520 is further configured to: after it is determined that a difference between a load ratio of the first service node at the boundary time-point and a load ratio of the second service node at the boundary time-point is greater than or equal to a first preset threshold, determine that the load status of the first service node at the boundary time-point meets the preset condition.

Optionally, the first service node is a service node whose load ratio at the boundary time-point is the highest in the at least two service nodes.

Optionally, the second service node is a service node whose load ratio at the boundary time-point is the lowest in the at least two service nodes.

Optionally, the target virtual node is a virtual node whose load ratio at the boundary time-point is the lowest in virtual nodes corresponding to the first service node in the first service time period.

Optionally, the load status of the first service node at the boundary time-point is determined according to a quantity of services transmitted to the first service node in the first time period.

Optionally, the processor 520 is specifically configured to extract decision information from the target packet, where the decision information includes at least one piece of the following information: a source Internet Protocol IP address of the target packet, a destination IP address of the target packet, a source port number of the target packet, a destination port number of the target packet, a communication protocol type of the target packet, a destination uniform resource locator of the target packet, and a service identity that is used to indicate a service to which the target packet belongs; and determine, according to the decision information, that the target packet is corresponding to the target virtual node.

Optionally, a difference between time precision of the device 500 and time precision of the user equipment falls within a preset range.

Optionally, the time precision of the device 500 is 10 milliseconds, and the time precision of the user equipment is 10 milliseconds.

In this embodiment of the present disclosure, the processor may also be referred to as a CPU. The memory may include a read-only memory and a random access memory, and provides an instruction and a signal to the processor. A part of the memory may further include a non-volatile random access memory (NVRAM). In specific application, the packet transmission device may be built-in, or itself may be a standard Ethernet communications device, such as a personal computer. Modules of the packet transmission device are coupled by using a bus system, where in addition to including a signal bus, the bus system further includes a power bus, a control bus, and a status signal bus.

The processor may implement or perform steps and logical block diagrams disclosed in the method embodiments of the present disclosure. A general purpose processor may be a microprocessor, or the processor may be any conventional processor, decoder, or the like. Steps of the methods disclosed with reference to the embodiments of the present disclosure may be directly executed and completed by means of a hardware processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the decoding unit or the processing unit.

It should be understood that in this embodiment of the present disclosure, the processor may be a central processing unit (Central Processing Unit, "CPU" for short), or the processor may be another general purpose processor, a digital signal processor (DSP), an application-specific integrated circuit (ASIC), a field programmable gate array (FPGA), another programmable logic device, a discrete gate or a transistor logic device, a discrete hardware component, or the like. The general purpose processor may be a microprocessor, or the processor may be any conventional processor or the like.

In an implementation process, the steps in the foregoing methods may be completed by using an integrated logic circuit of hardware in the processor or an instruction in a form of software. Steps of the methods disclosed with reference to the embodiments of the present disclosure may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

The packet transmission device 500 according to this embodiment of the present disclosure may be corresponding to a dispatching device (for example, a dispatching device #A) in the method according to the embodiments of the present disclosure. In addition, units, that is, modules, in the packet transmission device 500 and the foregoing other operations and/or functions are used to separately implement corresponding procedures of the method 100 in FIG. 1. For brevity, details are not described herein again.

According to the packet transmission device in the present disclosure, a dispatching device determines in advance a service node corresponding to a target virtual node in each service time period, and when sending a target packet of a target service, user equipment adds time indication information into the target packet, where the time indication information is used to indicate a time interval between a sending time of the target packet and a sending time of the first packet of the target service. Therefore, when determining that the target packet is corresponding to the target virtual node, the dispatching device can determine, according to the time indication information, a receiving time of the first packet of the target service and a service time period within which the receiving time of the first packet falls, so as to determine a service node to which the first packet of the target service is transmitted, and send the target packet to the service node to which the first packet of the target service is transmitted, which can maintain service continuity. In addition, a mapping relationship between a quintuple of a packet of a service and a service node that processes the service does not need to be stored, which can reduce memory overheads. Using a time period to index a server to which the packet is to be sent can improve packet dispatching efficiency.

FIG. 7 shows a packet transmission device 600 according to an embodiment of the present disclosure. The device 600 is configured in a communications system that includes at least two service nodes. As shown in FIG. 7, the device 600 includes:

a bus 610;
a processor 620 connected to the bus 610;
a memory 630 connected to the bus 610; and
a transceiver 640 connected to the bus 610.

The processor 620 invokes, by using the bus 610, a program stored in the memory 630, so as to: determine an interval between a sending time of a target packet and a sending time of the first packet of a target service, where the target packet belongs to the target service; and control the transceiver 640 to send the target packet to at least one dispatching device, where the target packet carries time indication information, and the time indication information is used to indicate the interval between the sending time of the target packet and the sending time of the first packet of the target service.

Optionally, a difference between time precision of the dispatching device and time precision of the device 600 falls within a preset range.

Optionally, the time precision of the dispatching device is 10 milliseconds, and the time precision of the device 600 is 10 milliseconds.

In this embodiment of the present disclosure, the processor may also be referred to as a CPU. The memory may include a read-only memory and a random access memory, and provides an instruction and a signal to the processor. A part of the memory may further include a non-volatile random access memory (NVRAM). In specific application, a packet transmission device may be built-in, or itself may be a standard Ethernet communications device, such as a personal computer. Modules of the packet transmission device are coupled by using a bus system, where in addition to including a signal bus, the bus system further includes a power bus, a control bus, and a status signal bus.

The processor may implement or perform steps and logical block diagrams disclosed in the method embodiments of the present disclosure. A general purpose processor may be a microprocessor, or the processor may be any conventional processor, decoder, or the like. Steps of the methods disclosed with reference to the embodiments of the present disclosure may be directly executed and completed by means of a hardware processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the decoding unit or the processing unit.

It should be understood that in this embodiment of the present disclosure, the processor may be a central processing unit (Central Processing Unit, "CPU" for short), or the processor may be another general purpose processor, a digital signal processor (DSP), an application-specific integrated circuit (ASIC), a field programmable gate array (FPGA), another programmable logic device, a discrete gate or a transistor logic device, a discrete hardware component, or the like. The general purpose processor may be a microprocessor, or the processor may be any conventional processor or the like.

In an implementation process, the steps in the foregoing methods may be completed by using an integrated logic circuit of hardware in the processor or an instruction in a form of software. Steps of the methods disclosed with reference to the embodiments of the present disclosure may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

The packet transmission device 600 according to this embodiment of the present disclosure may be corresponding to user equipment in the method according to the embodiments of the present disclosure. In addition, units, that is, modules, in the packet transmission device 600 and the foregoing other operations and/or functions are used to separately implement corresponding procedures of the method 200 in FIG. 3. For brevity, details are not described herein again.

According to the packet transmission device in the present disclosure, a dispatching device determines in advance a service node corresponding to a target virtual node in each service time period, and when sending a target packet of a target service, user equipment adds time indication information into the target packet, where the time indication information is used to indicate a time interval between a sending time of the target packet and a sending time of the first packet of the target service. Therefore, when determining that the target packet is corresponding to the target virtual node, the dispatching device can determine, according to the time indication information, a receiving time of the first packet of the target service and a service time period within which the receiving time of the first packet falls, so as to determine a service node to which the first packet of the target service is transmitted, and send the target packet to the service node to which the first packet of the target service is transmitted, which can maintain service continuity. In addition, a mapping relationship between a quintuple of a packet of a service and a service node that processes the service does not need to be stored, which can reduce memory overheads. Using a time period to index a server to which the packet is to be sent can improve packet dispatching efficiency.

Figure 8:
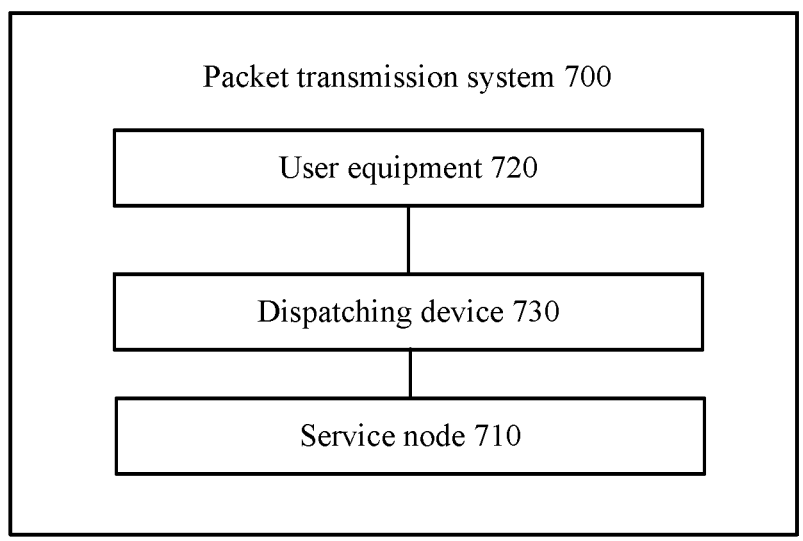
FIG. 8 shows a schematic architecture of a packet transmission system according to an embodiment of the present disclosure.

The foregoing describes the packet transmission method in the embodiments of the present disclosure in detail with reference to FIG. 1 to FIG. 3, and the following describes a packet transmission system in an embodiment of the present disclosure in detail with reference to FIG. 8.

FIG. 8 shows a packet transmission system 700 according to an embodiment of the present disclosure. As shown in FIG. 8, the system 700 includes:

at least two service nodes 710, configured to perform service processing on a packet transmitted to the at least two service nodes, where a target virtual node in at least one virtual node has at least two service time periods, the target virtual node is corresponding only to one service node in one service time period, and the target virtual node is corresponding to different service nodes in two adjacent service time periods;

at least one user equipment 720, configured to send a target packet to the service node when accessing a target service, where the target packet carries time indication information, and the time indication information is used to indicate an interval between a sending time of the target packet and a sending time of the first packet of the target service; and at least one dispatching device 730, configured to: receive the target packet sent by the user equipment, and determine that the target packet is corresponding to the target virtual node; determine a receiving time of the first packet of the target service according to a receiving time of the target packet and the time indication information; and determine a target service node from the at least two service nodes according to the receiving time of the first packet of the target service, and forward the target packet to the target service node, where the receiving time of the first packet of the target service falls within a target time period, and the target service node is a service node corresponding to the target virtual node in the target time period.

The dispatching device 730 according to this embodiment of the present disclosure may be corresponding to a dispatching device in the method according to the embodiments of the present disclosure. In addition, units, that is, modules, in the dispatching device 730 and the foregoing other operations and/or functions are used to separately implement corresponding procedures of the method 100 in FIG. 1. For brevity, details are not described herein again.

The user equipment 720 according to this embodiment of the present disclosure may be corresponding to user equipment in the method according to the embodiments of the present disclosure. In addition, units, that is, modules, in the user equipment 720 and the foregoing other operations and/or functions are used to separately implement corresponding procedures of the method 200 in FIG. 3. For brevity, details are not described herein again.

According to the packet transmission system in the present disclosure, a dispatching device determines in advance a service node corresponding to a target virtual node in each service time period, and when sending a target packet of a target service, user equipment adds time indication information into the target packet, where the time indication information is used to indicate a time interval between a sending time of the target packet and a sending time of the first packet of the target service. Therefore, when determining that the target packet is corresponding to the target virtual node, the dispatching device can determine, according to the time indication information, a receiving time of the first packet of the target service and a service time period within which the receiving time of the first packet falls, so as to determine a service node to which the first packet of the target service is transmitted, and send the target packet to the service node to which the first packet of the target service is transmitted, which can maintain service continuity. In addition, a mapping relationship between a quintuple of a packet of a service and a service node that processes the service does not need to be stored, which can reduce memory overheads. Using a time period to index a server to which the packet is to be sent can improve packet dispatching efficiency.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet transmission method, wherein the method is executed in a communications system that comprises at least two service nodes and at least one virtual node, a target virtual node in the at least one virtual node has at least two service time periods, the target virtual node is corresponding only to one service node within one service time period, and the target virtual node is corresponding to different service nodes in two adjacent service time periods; and the method comprises:

receiving, by a dispatching device, a target packet sent by a user equipment, and determining that the target packet is corresponding to the target virtual node, wherein the target packet belongs to a target service, the target packet carries time indication information, and the time indication information is used to indicate an interval between a sending time of the target packet and a sending time of a first packet of the target service;

determining a receiving time of the first packet of the target service according to a receiving time of the target packet and the time indication information; and determining a target service node from the at least two service nodes according to the receiving time of the first packet of the target service, and forwarding the target packet to the target service node, wherein the receiving time of the first packet of the target service falls within a target time period, and the target service node is a service node corresponding to the target virtual node in the target time period.

2. The method according to claim 1, wherein the method further comprises:

determining, by the dispatching device, a boundary time-point, wherein the target virtual node is corresponding to a first service node in a time period before the boundary time-point, and a load status of the first service node at the boundary time-point meets a preset condition;

allocating two service time periods to the target virtual node according to the boundary time-point, wherein the boundary time-point is an end time of a first service time period, the boundary time-point is a start time of a second service time period, the first service time period is the time period before the boundary time-point, and the second service time period is a time period after the boundary time-point; and wherein the target virtual node is corresponding to the first service node in the first service time period, and wherein the target virtual node is corresponding to a second service node in the second service time period.

3. The method according to claim 2, wherein that a load status of the first service node at the boundary time-point meets a preset condition comprises:

a difference between a load ratio of the first service node at the boundary time-point and a load ratio of the second service node at the boundary time-point is greater than or equal to a first preset threshold.

4. The method according to claim 3, wherein the first service node is a service node whose load ratio at the boundary time-point is the highest in the at least two service nodes.

5. The method according to claim 4, wherein the second service node is a service node whose load ratio at the boundary time-point is the lowest in the at least two service nodes.

6. The method according to claim 5, wherein the target virtual node is a virtual node whose load ratio at the boundary time-point is the lowest in virtual nodes corresponding to the first service node in the first service time period.

7. The method according to claim 1, wherein the determining that the target packet is corresponding to the target virtual node comprises:

extracting decision information from the target packet, wherein the decision information comprises at least one piece of the following information: a source Internet Protocol (IP) address of the target packet, a destination IP address of the target packet, a source port number of the target packet, a destination port number of the target packet, a communication protocol type of the target packet, a destination uniform resource locator of the target packet, and a service identity that is used to indicate a service to which the target packet belongs; and determining, according to the decision information, that the target packet is corresponding to the target virtual node.

8. A packet transmission apparatus, wherein the apparatus is configured in a communications system that comprises at least two service nodes and at least one virtual node, a target virtual node in the at least one virtual node has at least two service time periods, the target virtual node is corresponding only to one service node in one service time period, and the target virtual node is corresponding to different service nodes in two adjacent service time periods; and the apparatus comprises:

a transceiver, configured to receive a target packet sent by a user equipment;

a processor, configured to: determine that the target packet received by the transceiver is corresponding to the target virtual node, wherein the target packet belongs to a target service, the target packet carries time indication information, and the time indication information is used to indicate an interval between a sending time of the target packet and a sending time of the first packet of the target service; determine a receiving time of the first packet of the target service according to a receiving time of the target packet and the time indication information; and determine a target service node from the at least two service nodes according to the receiving time of the first packet of the target service, wherein the receiving time of the first packet of the target service falls within a target time period, and the target service node is a service node corresponding to the target virtual node in the target time period; and the transceiver is further configured to forward the target packet to the target service node determined by the processor.

9. The apparatus according to claim 8, wherein the processor is further configured to:

determine a boundary time-point, wherein the target virtual node is corresponding to a first service node in a time period before the boundary time-point, and a load status of the first service node at the boundary time-point meets a preset condition;

allocate two service time periods to the target virtual node according to the boundary time-point, wherein the boundary time-point is an end time of a first service time period, the boundary time-point is a start time of a second service time period, the first service time period is the time period before the boundary time-point, and the second service time period is a time period after the boundary time-point; and wherein the target virtual node is corresponding to the first service node in the first service time period, and the target virtual node is corresponding to a second service node in the second service time period.

10. The apparatus according to claim 9, wherein the processor is configured to: when a difference between a load ratio of the first service node at the boundary time-point and a load ratio of the second service node at the boundary time-point is greater than or equal to a first preset threshold, determine that the load status of the first service node at the boundary time-point meets the preset condition.

11. The apparatus according to claim 10, wherein the first service node is a service node whose load ratio at the boundary time-point is the highest in the at least two service nodes.

12. The apparatus according to claim 11, wherein the second service node is a service node whose load ratio at the boundary time-point is the lowest in the at least two service nodes.

13. The apparatus according to claim 12, wherein the target virtual node is a virtual node whose load ratio at the boundary time-point is the lowest in virtual nodes corresponding to the first service node in the first service time period.

14. The apparatus according to claim 9, wherein the load status of the first service node at the boundary time-point is determined according to a quantity of services transmitted to the first service node in the first time period.

15. The apparatus according to claim 8, wherein the processor is configured to extract decision information from the target packet, wherein the decision information comprises at least one piece of the following information: a source Internet Protocol IP address of the target packet, a destination IP address of the target packet, a source port number of the target packet, a destination port number of the target packet, a communication protocol type of the target packet, a destination uniform resource locator of the target packet, and a service identity that is used to indicate a service to which the target packet belongs; and determine, according to the decision information, that the target packet is corresponding to the target virtual node.

16. The apparatus according to claim 8, wherein a difference between time precision of the apparatus and time precision of the user equipment falls within a preset range.

17. The method according to claim 16, wherein the time precision of the apparatus is 10 milliseconds, and the time precision of the user equipment is 10 milliseconds.

* * * * *